March 22, 1927.

A. M. CAPRA 1,621,767

FILTER PRESS

Filed Jan. 12, 1925     5 Sheets-Sheet 1

Inventor

A. M. Capra,

By

Attorney

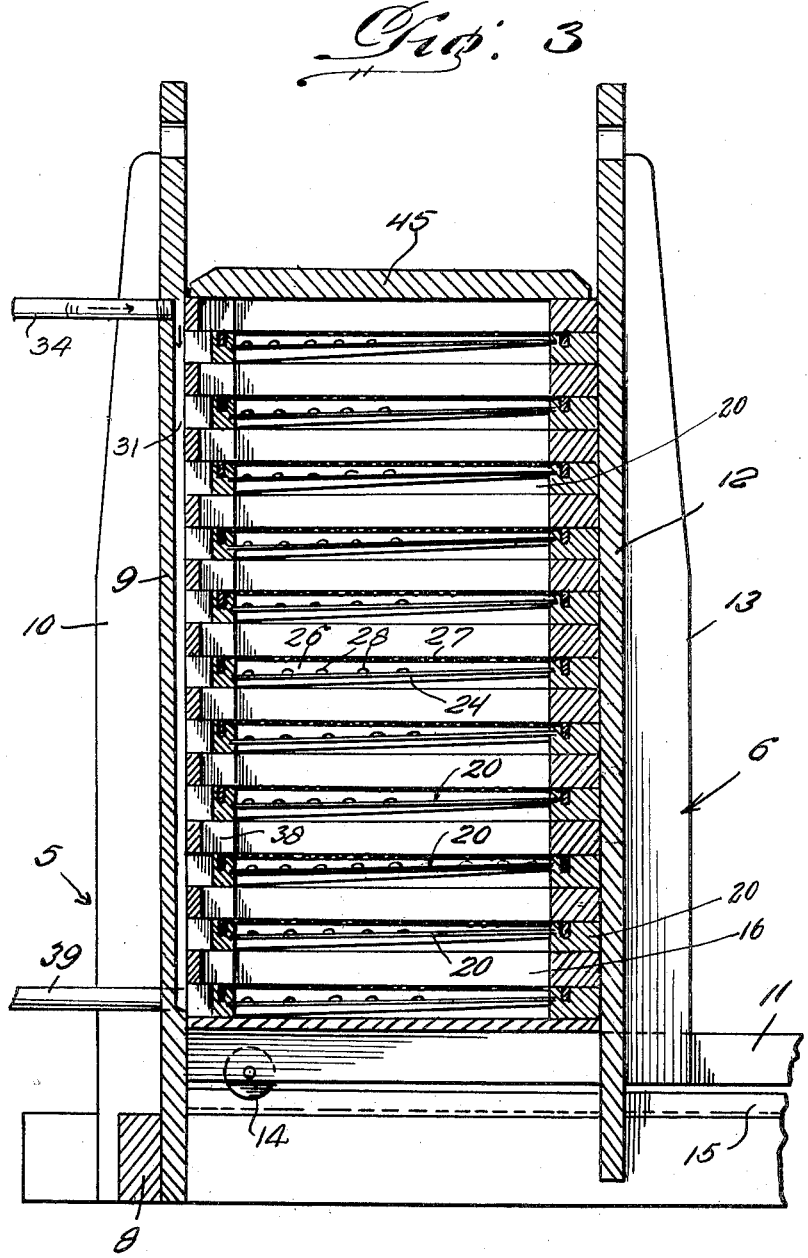

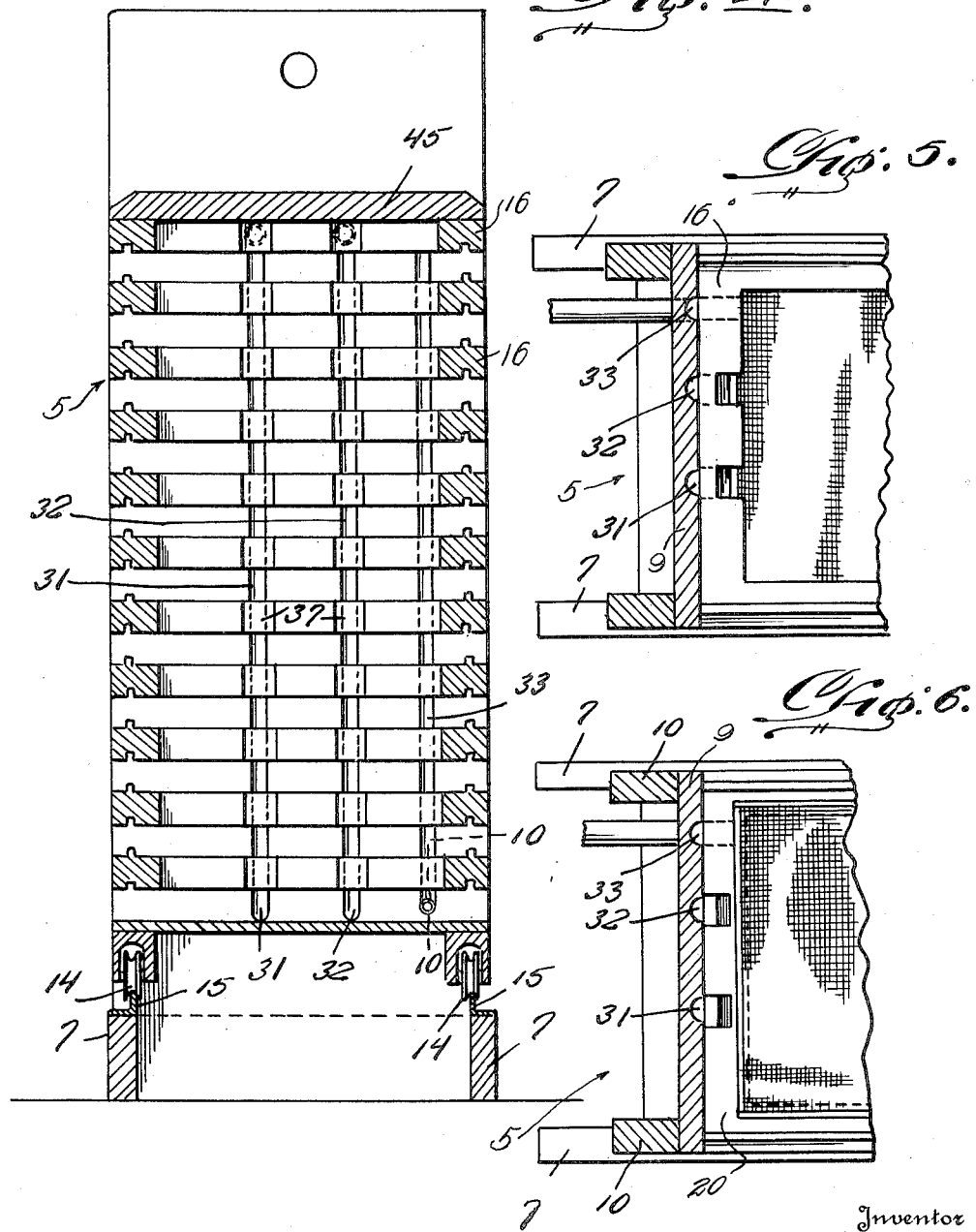

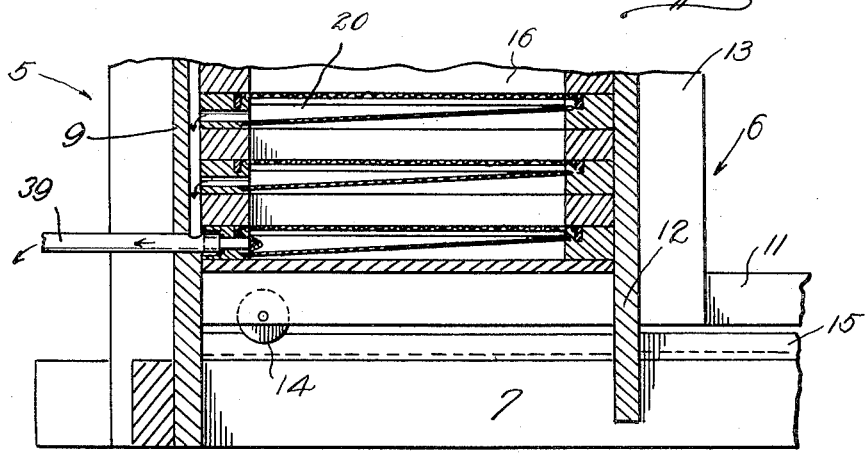
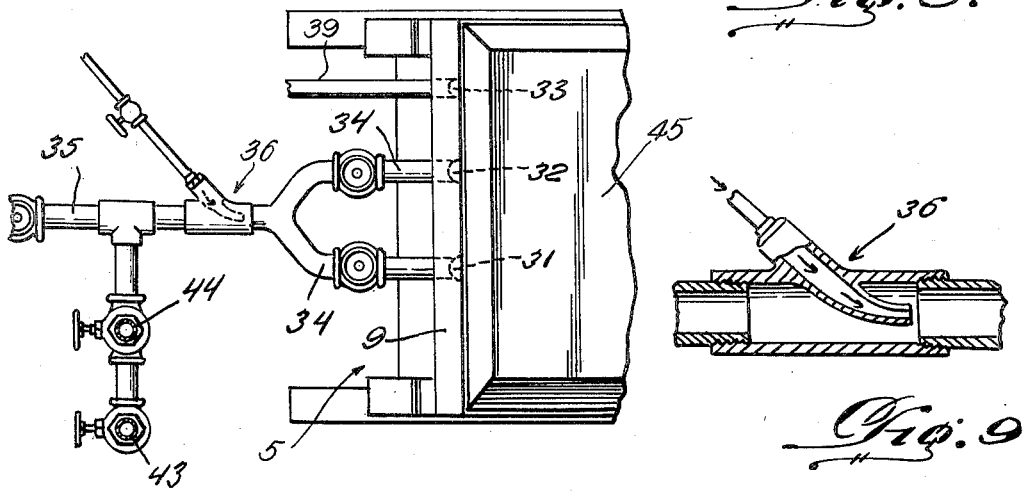
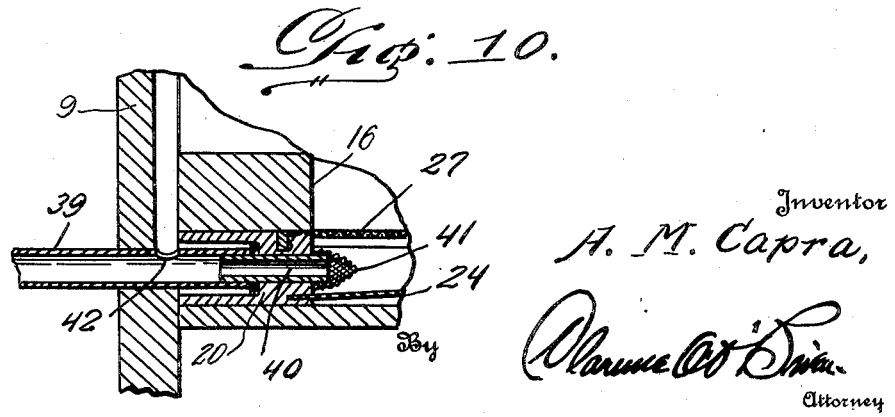

March 22, 1927. 1,621,767
A. M. CAPRA
FILTER PRESS
Filed Jan. 12, 1925  5 Sheets-Sheet 5

Inventor
A. M. Capra,
Attorney

Patented Mar. 22, 1927.

1,621,767

UNITED STATES PATENT OFFICE.

ANGELO M. CAPRA, OF PHILADELPHIA, PENNSYLVANIA, ASSIGNOR, BY MESNE ASSIGNMENTS, TO CAPRA FILTER PRESS CORPORATION, A CORPORATION OF DELAWARE.

FILTER PRESS.

Application filed January 12, 1925. Serial No. 1,936.

This invention relates to filter presses primarily adapted for use in the dye manufacturing industry.

The primary object of the invention resides in the provision of a press wherein all operations of the same are occasioned automatically thereby dispensing with the presence of one or more operators at the press during the filtering of the silage, the scraping of the filter sections and the scavenging of the apparatus.

In the use of filter presses now employed in the dye industry, it is necessary, after the filtering of the silage, that workmen remove the filter sections and scrape the same free from the residue. This residue contains poisonous matter and it very frequently happens that the workmen are overcome by the gases arising therefrom.

An additional object is to provide highly novel and efficient means whereby the residue is scraped from the filter sections in the operation of the device.

A further object of the invention is to provide a press of this character wherein it is not necessary to remove the filter sections or any part of the apparatus in the successful operation of the same.

In the present invention the filter sections are arranged in a horizontal position in contradistinction to the vertical arrangement now present in filter presses, it being a still further salient object to provide means whereby the silage will be projected onto all of the sections in order that the highest efficiency of operation may be attained.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the different views:

Figure 3 is an enlarged detail vertical sectional view of the major portion of the apparatus.

Figure 4 is an enlarged vertical section taken substantially upon the line 4—4 of Figure 2, and at right angles with the section line upon which Figure 3 is taken.

Figure 5 is an enlarged fragmentary longitudinal section taken substantially upon the line 5—5 of Figure 1.

Figure 6 is a similar view taken substantially upon the line 6—6 of Figure 1.

Figure 7 is an enlarged fragmentary vertical section of the lower portion of the apparatus upon a line slightly inwardly from the line upon which Figure 3 is taken for disclosing the manner of discharge of the filtered silage.

Figure 8 is a fragmentary top plan view of the filter press.

Figure 9 is an enlarged detail sectional view of a preferred form of injector employed in conjunction with the present invention whereby the silage is injected into the press under pressure, and Figure 10 is a fragmentary section taken substantially upon the line 10—10 of Figure 4 for more clearly disclosing an interfitting joint between certain elements of the stationary unit and traveler unit that constitutes the primary structural unit of the press as hereinafter more fully described.

Figure 11:
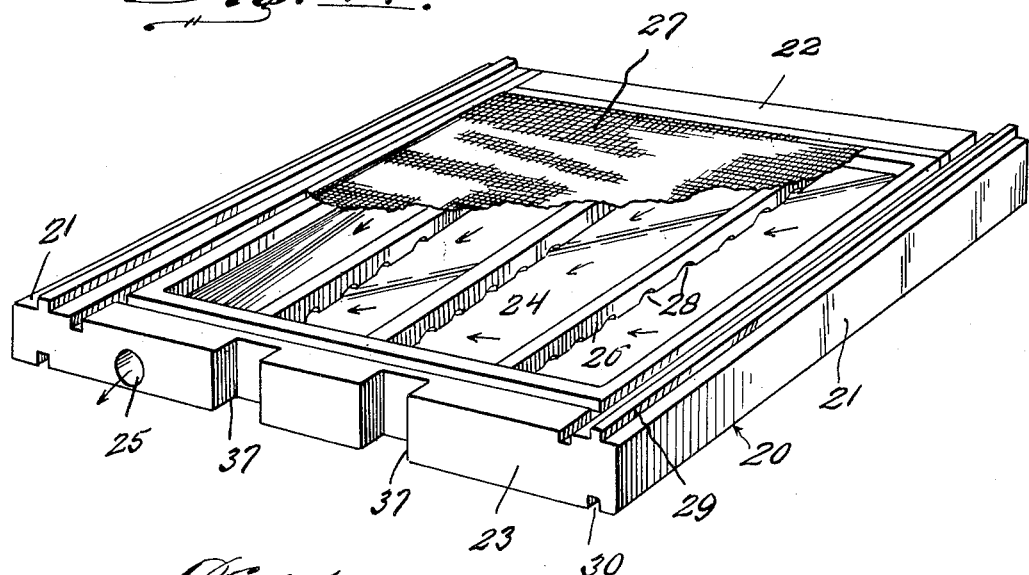

Figure 11 is a perspective view of one of the filter sections.

Figure 12:
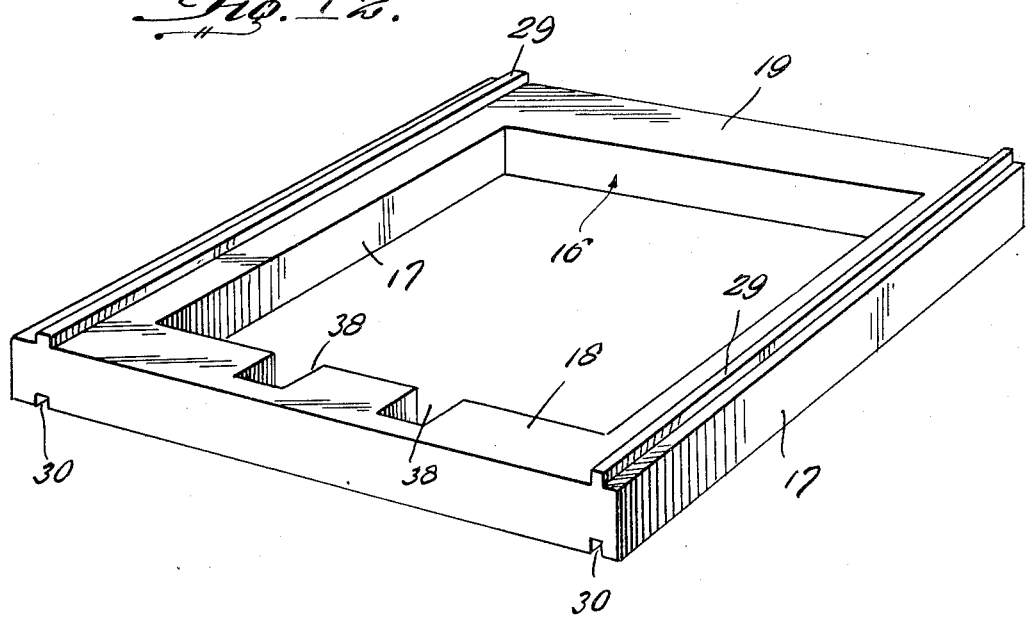

Figure 12 is a perspective view of the open frame section.

Prior to the specific description of the apparatus it is desired to state that the press is preferably disposed in an air tight room and that all of the manually controlled elements such as the silage regulating valves, etc., etc. be disposed outside of the room in order that workmen need not come within close proximity of the apparatus and thereby inhale the obnoxious and deadly gases arising therefrom.

Now having particular reference to the drawings, the apparatus comprises principally a stationary unit and a traveler unit designated generally 5 and 6 respectively. The stationary unit includes a base for the entire apparatus comprising a pair of relatively elongated spaced parallel bars 7—7 that are suitably joined adjacent their opposite ends by cross bars 8. Rigidly secured at the lower end to the proper cross bar 8 of the frame is a vertical board 9 that provides a backing for the stationary unit. This board is suitably braced at its vertical edges by brace boards 10.

The traveler unit 6 includes a pair of longitudinally extending spaced parallel bars 11—11 in substantial parallelism with the stationary unit bars 7—7. Adjacent the outer ends of said bars 11—11 is a vertically extending board 12 that constitutes the backing for the traveler unit, this board being also braced at its vertical edges by brace boards 13.

The lower edges of the traveler unit bars 11—11 carry grooved rollers 14 for rolling engagement upon rails 15 on the upper surface of the base bars 7—7 for obviously permitting the efficient movement of the traveler unit toward and away from the stationary unit in a manner and for a purpose hereinafter more fully described.

Suitably rigidly secured to the inner face of the stationary unit board 9, throughout the major portion of a length thereof, are a plurality of horizontally disposed frame members 16 which are in vertical spaced relation a distance substantially equal to the thickness of one of the frame members. As shown in Figure 12 each of these frame members include side members 17—17 and inner and outer connecting members 18 and 19 respectively.

Suitably rigidly secured to the inner face of the traveler unit board 12, also throughout the major portion of its length are a plurality of horizontally disposed filter sections 20 which are in staggered relation with respect to the frame members 16 of the stationary unit, and similarly spaced in order that an interfitting and sliding relation therebetween may be established.

As shown in Figure 11, these filter sections are identical in shape to the frame members 16, the same each comprising side members 21—21 and inner and outer connecting members 22 and 23. Each of these filter sections includes also a bottom wall 24 of suitable metal that is so shaped throughout practically its entire area as to cause the filtered silage to discharge through an opening 25 in the outer member 23 adjacent one end thereof. Upon the top side of said wall are longitudinally extending spaced bars 26 upon the top surface of which a filtering screen 27 rests, these bars effectively preventing the sagging of the screen by the weight of the silage and residue thereon. In order to permit free passage of the silage upon the wall 24 said bars are formed with channels 28 at the lower edges thereof.

In order to prevent the escape of the silage between the outer edges of the frame members 16 and the filter sections 20, the side members thereof are formed with interfitting ribs and channels 30 and 29 respectively, that extend longitudinally of the side members.

It is preferable that the silage to be filtered be permitted to pass onto the lowermost filter section and thence upwardly through the remaining sections so that the entire number of sections may be employed for the filtering operation. For obtaining this result the inner face of the board 9 of the stationary unit 5 is formed with vertically extending spaced channels, preferably three in number and designated respectively, 31, 32 and 33. The length of these channels is approximately that of the combined width of the frame members 16 and filter sections 20. Communicating with the upper ends of the channels 31 and 32, which are the silage inlet channels, are valved pipes 34—34 that have a common connection with a main supply pipe 35. As a means for accelerating the flow of the silage, a suitable air injector 36 may be employed. The best result can be obtained by employing an injector of the type disclosed in Figure 8. As more clearly shown in Figures 11 and 12 the filter sections 20 and frame members 16 are formed with partially registering vertical slots 37—37 and 38—38 respectively. The slots in the filter sections are formed in the outer faces of the outer bars 23 while the slots of the frame members are formed in the inner faces of the inner members 18, for the purpose of establishing communication between the filter sections as clearly shown in Figure 3. The slots of the frame members and filter sections are directly in alignment with the silage inlet channels 31 and 32 and it will be apparent that the tendency of the silage will be to flow downwardly, whereby the lowermost filter section will be first filled. The silage will obviously work its way upwardly through the partially registering slots 37 and 38 thereby enabling the entire number of filter sections to be filled.

It is not to be understood that a pair of flow channels 31 and 32 are necessary in the successful operation of the apparatus. More or less can be provided as desired. The number of slots in the frame members and filter sections will of course have to correspond with the number of flow channels.

The channel 33 is the filtered silage discharge channel, the same being formed in horizontal alignment with the discharge openings 25 of the filter section as shown in Figures 7 and 8 whereby the filtered silage flowing from the openings 25 may be conveyed downwardly to a discharge pipe 39, one end of which extends through the backing board 9 of the stationary unit 5 at the lower end of the channel 33 as clearly shown in Figures 7 and 10. This end of the pipe 39 extends within the apparatus and is adapted, when the apparatus is closed, to engage over one end of a pipe section 40 within the discharge opening 25 of the lowermost filter section in order that a tight joint may be established between the pipe 39 and the outlet of said lowermost filter section. If desired, the inner end of the short pipe 40 may be equipped with a strainer 41. Communication is established between the pipe 39 and the strained silage channel 33 through means of an opening 42 formed in the upper surface of the pipe 39, Figure 10.

From the showing and description it will be clear that the traveler unit 6, which carries the filter sections 20, is adapted to be moved toward and away from the stationary unit in the operation of the apparatus, this movement being preferably occasioned in an entirely automatic manner hereinafter more fully described. The movement of the traveler unit away from the stationary unit is so controlled as to prevent the total disengagement of the frame members 16 and filter sections 20. Obviously the frame members 16 not only provide a spacing medium for the filter sections but also serve as a means for supporting the same in a horizontal manner, and vice versa.

As before pointed out the regulating valves for the silage flow are arranged externally of the room containing the apparatus. The valves may be controlled manually or automatically. In fact means may be provided whereby these valves are actuated in timed relation with the operation of the automatic traveler unit control means. However, no claim is made to the valve construction nor actuating means therefor.

Figure 1:
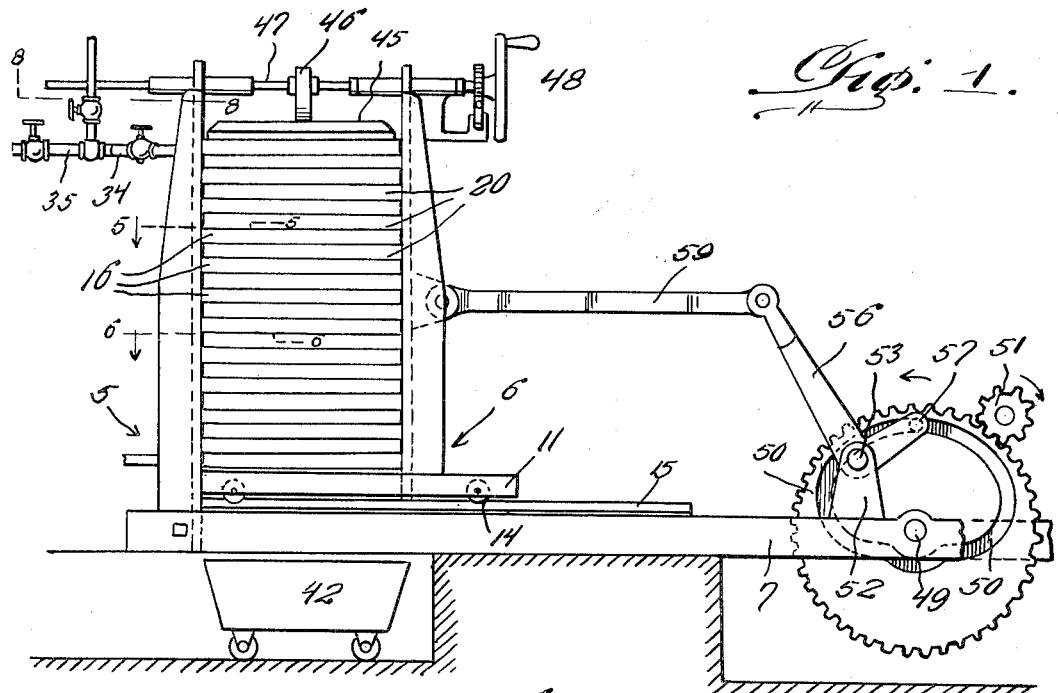
Figure 1 is a side elevational view of a filter press constructed in accordance with the present invention, the same being shown in a closed position.
Figure 2:
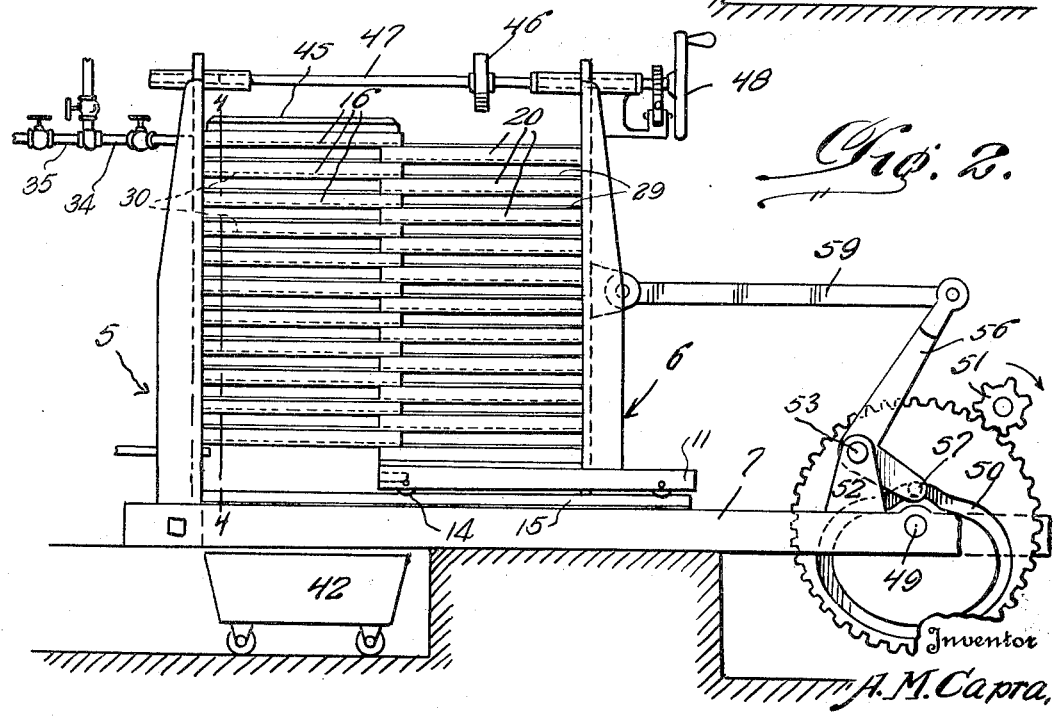
Figure 2 is a similar view showing the filter press in an open position.

In the operation of the apparatus, assuming that the press is in the closed condition as in Figure 1, the valves are opened and the silage will pass into the filter sections, in a manner before described, the undissolved particles of the matter in the silage being caught upon the screens 27 of the filter sections. The filtered silage discharges through the pipe 39 into a suitable container. Prior to the opening of the apparatus the silage is cut off and the traveler unit then moves slowly away from the stationary unit. The lower faces of the outer members 19 of the frames 16 have sliding contact with the frame bars 22 and 23 of the filter sections and thereby act as scrapers during the outward movement of the traveler unit for cleaning the screens. The material scraped from the screens will drop through the frames 16 into a container 42 disposed beneath the apparatus in a pit formed in the room floor.

After the aparatus has again been closed, the elements may be cleaned by directing steam or water, or both, into the press. For obtaining this result a steam pipe 43 and water pipe 44 have communication with the silage pipe 35, Figure 8. After the cleaning operation silage is again directed into the press.

For maintaining the filter sections and frame members in compact relation during the filtering and cleaning operation, any desirable means may be provided. However, for purpose of illustration this means is shown as comprising a board 45 that rests upon the uppermost frame member 16. This board is adapted to be engaged by a cam wheel 46 carried by a horizontal shaft 47 journaled in elongated bearings 48 carried by the upper ends of the backing boards of the stationary and traveler unit.

One end of the shaft 47 is provided with any suitable means whereby the shaft may be partially rotated in order that the high point of the cam 46 may be brought into engagement with the board 45 when the apparatus is closed. This means is designated generally 48, and even though the same is shown as a manual operating means it is preferable that the shaft be so connected to the traveler unit automatic actuating mechanism as to be controlled automatically at the time the traveler unit is moved to the closed position of Figure 1. Here again I make no claim to the means for maintaining the filter sections and frame members in compact relation. Any desirable and efficient form of mechanism may be provided.

For purpose of illustration the automatic actuating means for moving the traveler unit 6 slowly toward and away from the stationary unit 5 is shown as comprising a horizontally disposed shaft 49 that is suitably journaled at its opposite ends in the bars 7—7 of the stationary unit 5. This shaft carries a relatively large spur gear 50 that has mesh with a relatively smaller spur gear 51 that is rotated through the medium of a suitable power plant (not shown). The frame bars 7 directly adjacent the spur gear 50 is provided with a vertical lug or ear 52 to the upper end of which is pivotally secured as at 53 a bell crank 54. The free end of the short arm of this bell crank carries an inwardly directed pin 57 that engages within a suitable cam groove 58 upon the adjacent face of the gear 50. The long arm of this bell crank 56 is pivotally connected to one end of a relatively elongated connecting link 59 that has pivotal connection at its opposite end to the backing board of the stationary unit 6.

The automatic means for moving the traveler unit toward and away from the stationary unit is preferably of such construction as to maintain the traveler unit in closed condition with respect to the stationary unit for a substantial length of time after which the traveler unit moves to open position and then practically immediately returns to closed position.

From the foregoing description when considered in conjunction with the accompanying drawings it will be apparent to those skilled in the art that I have provided a highly novel useful and efficient filter press primarily adapted for use in the dye manufacturing industry and one wherein the filtering and cleaning operations may be occasioned entirely in an automatic manner and without requiring the presence of any workmen whatever at the apparatus during the operation of the same. It will also be seen that the screens of the filter sections will be efficiently scraped of all residue and that each of these filter sections will be employed in the filtering operation.

It is to be understood that I do not wish to be limited to the specific showing and description insomuch as in the future practice of the invention necessary changes and modifications may be made without departing from the spirit and scope of the appended claims.

Having thus described the invention, and what I desire to secure by Letters Patent is:—

1. In a filter press of the character described, a pair of units, a vertical series of spaced frame members included in one unit, a vertical series of spaced filter sections included in the other unit and having interfitting relation with the frame members of the first mentioned unit, a material supply and filtrate discharge for one of the units and cooperating construction between the filter sections of one unit, and the frame members of the other unit whereby the fluid will be permitted to flow from the lowermost filter section upwardly in order that all of the filter sections will be employed in the filtering operation.

2. In a filter press of the kind described, a pair of spaced vertical parallel boards, a base connected with one of said boards, a track mounted upon said base, means slidably mounting the remaining board upon said track whereby to provide relatively movable and stationary boards, a plurality of spacing frames attached to said stationary board, a plurality of vertically spaced filters attached to the movable board, said frames being disposed in interfitting sliding contact betwen the said filters, said stationary board being provided with a channel extending from the top to the bottom and serving to conduct the material to be filtered to the lowermost filter, said stationary board being also formed with a discharge passage for the filtrate common to all of said filters, and said filters being provided with individual outlets communicating with said discharge passage.

3. In a filter press of the class described, a pair of relatively stationary and movable units, each unit comprising a vertically disposed board, said boards being disposed in spaced parallelism, a plurality of vertically spaced filters carried by the board of said movable unit, a plurality of open rectangular frames carried by the board of the stationary unit, said frames being disposed in vertically spaced superposed relation to permit them to fit between the filters, said filters and frames being of similar proportion and the frames defining a marginal closure around the spaces between the filters.

4. In a filter press of the class described, a relatively movable unit comprising a supporting board and a plurality of horizontal vertically spaced filters, each filter comprising an open frame, a sheet of foraminous material carried thereby, a filtrate collecting pan disposed below said sheet, and a discharge opening, said pan being formulated to provide a gutter leading to said discharge opening.

5. In a filter press of the character described, a pair of cooperative units adapted to be moved into and out of engagement with each other, vertically spaced filter sections carried by one unit, and vertically spaced open frame members carried by the other unit for disposition between the filter sections for supporting and guiding said filter sections and for functioning additionally as scrapers for the filter sections when the units are moved out of engagement with each other whereby the material scraped from the filter section will drop, by gravity, down through the open spaces in said frames, all of said filter sections and frames being disposed in horizontal planes.

6. In a filter press of the character described, a stationary unit, a traveler unit, vertically spaced filter sections carried by one unit, vertically spaced open frame members carried by the other unit for the interfitting relation with the filter sections, said filter sections and frames being disposed in horizontal planes, and automatically operable means for moving the traveling unit towards and from the stationary unit, said frames functioning as guiding and supporting means for the filter sections, as scrapers for removing material from said filter sections, and the central open spaces of said frames being disposed in vertical alinement, whereby the material scraped from the filter sections will drop by gravity down through said openings.

7. In a filter press of the character described, a stationary unit, a traveler unit, vertically spaced filter sections carried by one unit, vertically spaced open frame members carried by the other unit for the interfitting relation with the filter sections, said filter sections and frames being disposed in horizontal planes, and automatically operable means for moving the traveling unit towards and from the stationary unit, said frames functioning as guiding and supporting means for the filter sections, as scrapers for removing material from said filter sections, and central open spaces of said frames being disposed in vertical alinement, whereby the material scraped from the filter sections will drop by gravity down through said openings, a vertically arranged inlet communicating with each filter section, and a separate outlet for each filter section leading to a common discharge.

In testimony whereof I affix my signature.

ANGELO M. CAPRA.